United States Patent [19]
Scherer

[11] Patent Number: 5,966,429
[45] Date of Patent: *Oct. 12, 1999

[54] TELEPHONE TRANSACTION PROCESSING AS A PART OF A CALL TRANSPORT

[75] Inventor: Gordon F. Scherer, Westerville, Ohio

[73] Assignee: Convergys Customer Management Group Inc., Cincinnati, Ohio

[ * ] Notice: This patent is subject to a terminal disclaimer.

[21] Appl. No.: 09/170,929

[22] Filed: Oct. 13, 1998

Related U.S. Application Data

[63] Continuation of application No. 08/987,215, Dec. 9, 1997, which is a continuation of application No. 08/472,150, Jun. 7, 1995, Pat. No. 5,748,711.

[51] Int. Cl.⁶ .................................................. H04M 11/04
[52] U.S. Cl. ........................................ 379/91.02; 379/121
[58] Field of Search .............................. 379/91.01, 91.02, 379/201, 114, 121, 122, 143, 154, 207, 218, 67.1, 68, 88.18, 265, 266

[56] References Cited

U.S. PATENT DOCUMENTS

| | | | |
|---|---|---|---|
| 3,920,908 | 11/1975 | Kraus | 379/91 |
| 4,071,698 | 1/1978 | Barger, Jr. et al. | 379/91 |
| 4,757,186 | 7/1988 | Heberle et al. | 235/380 |
| 4,797,911 | 1/1989 | Szlam et al. | 379/67 |
| 4,818,854 | 4/1989 | Davies et al. | 235/381 |
| 4,908,850 | 3/1990 | Masson et al. | 379/88 |
| 4,965,821 | 10/1990 | Bishop et al. | 379/91 |
| 4,999,806 | 3/1991 | Chernow et al. | 364/900 |
| 5,163,086 | 11/1992 | Ahearn et al. | 379/91 |
| 5,164,981 | 11/1992 | Mitchell et al. | 379/88 |
| 5,210,789 | 5/1993 | Jeffus et al. | 379/91 |
| 5,227,612 | 7/1993 | Le Roux | 235/379 |
| 5,329,589 | 7/1994 | Fraser et al. | 379/91 |
| 5,333,181 | 7/1994 | Biggs | 379/91 |
| 5,388,148 | 2/1995 | Seiderman | 379/59 |
| 5,402,474 | 3/1995 | Miller et al. | 379/91 |
| 5,748,711 | 5/1998 | Scherer | 379/91.02 |
| 5,872,833 | 2/1999 | Scherer | 379/91.02 |

*Primary Examiner*—Wing F. Chan
*Attorney, Agent, or Firm*—Standley & Gilcrest LLP

[57] ABSTRACT

A telephone transaction processing system is disclosed. Processing of telephone transactions, such as credit card transactions, financial account debiting, or information collection, is facilitated by an agent that may be integrated into the transport of the carrier as an enhanced service, the telephone network of a local or long distance company, or a private branch exchange or computer or separate processor supporting said telephone call. The agent may be invoked through touch tones or voice commands by any party on a completed telephone call and may be invoked multiple times during a conversation.

1 Claim, 2 Drawing Sheets

TELEPHONE TRANSACTION PROCESSING AS A PART OF A CALL TRANSPORT

This application is a continuation application under 37 CFR 1.53(b) of prior application Ser. No. 08/987,215, filed on Dec. 9, 1997; which is a continuation of application Ser. No. Ser. No. 08/472,150, filed Jun. 7, 1995, U.S. Pat. No. 5,748,711.

BACKGROUND AND SUMMARY OF THE INVENTION

The present invention relates generally to telecommunication systems for facilitating transaction processing through telephone calls, for example, a credit card transaction. In particular, the present invention relates to a system for invoking and using a transaction agent that is integrated in the transport of the telephone call as an enhanced feature for the telephone systems serving one or more of the one of the parties of the telephone call.

In the traditional approach to ordering merchandise with a credit card, a buyer may dial into an interactive voice response system (IVR) which talks to the buyer, collects credit card information; and validates the information. The buyer enters information into the IVR, with the call being passed to the called party after the credit card has been validated and possibly, charged. In other IVR systems, the buyer may give credit card information to the system which accepts the credit card information and then allows the call to go through to the seller. In either case, the call is not allowed to complete until the credit card information is entered from the caller's end, not the called party's end. Finally, the credit card data must be collected by the pay telephone system or IVR that the buyer is using, which now acts as a gateway. Presently, the IVR or credit card system may not be re-summoned and the charges may not be modified or deleted during the call.

In the traditional method for ordering merchandise from a catalog company, the seller's representative has a terminal on a desk or a card swipe or zon system. The credit card information is keyed in by the seller's representative rather than being entered through the telephone itself. The seller's representative reviews the display or the credit card station and validates the information through a system external to the telephone call between the buyer and the seller's representative. Using this method, there is no opportunity to modify the information related to a transaction without reentering the external system.

The traditional approaches to ordering merchandise or processing other types of transactions over the telephone do not have the flexibility to allow either the calling party or called party to enter data or to allow either party to modify the data once it has been collected. The present invention—the Telephone Charging Agent (TCA)—addresses these limitations by allowing two or more people on a telephone call to enter data (for example credit card data or other charging data such as a card number, a home telephone number, a dollar amount, etc.) using the telephone as the instrument of data entry (either the caller's phone or the called party's phone or one of the parties may speak the information through voice recognition), to be prompted during the call for data, and have the charges validated, manipulated, or refunded during the call. The advantages of the present invention are explained further by the accompanying drawings and detailed description.

BRIEF DESCRIPTION OF THE DRAWINGS.

Novel features and advantages of the present invention, in addition to those mentioned above, will become apparent to those skilled in the art from a reading of the following detailed description in conjunction with the accompanying drawings wherein similar reference characters refer to similar parts and in which.

DETAILED DESCRIPTION OF THE PREFERRED EMBODIMENTS

Figure 1:
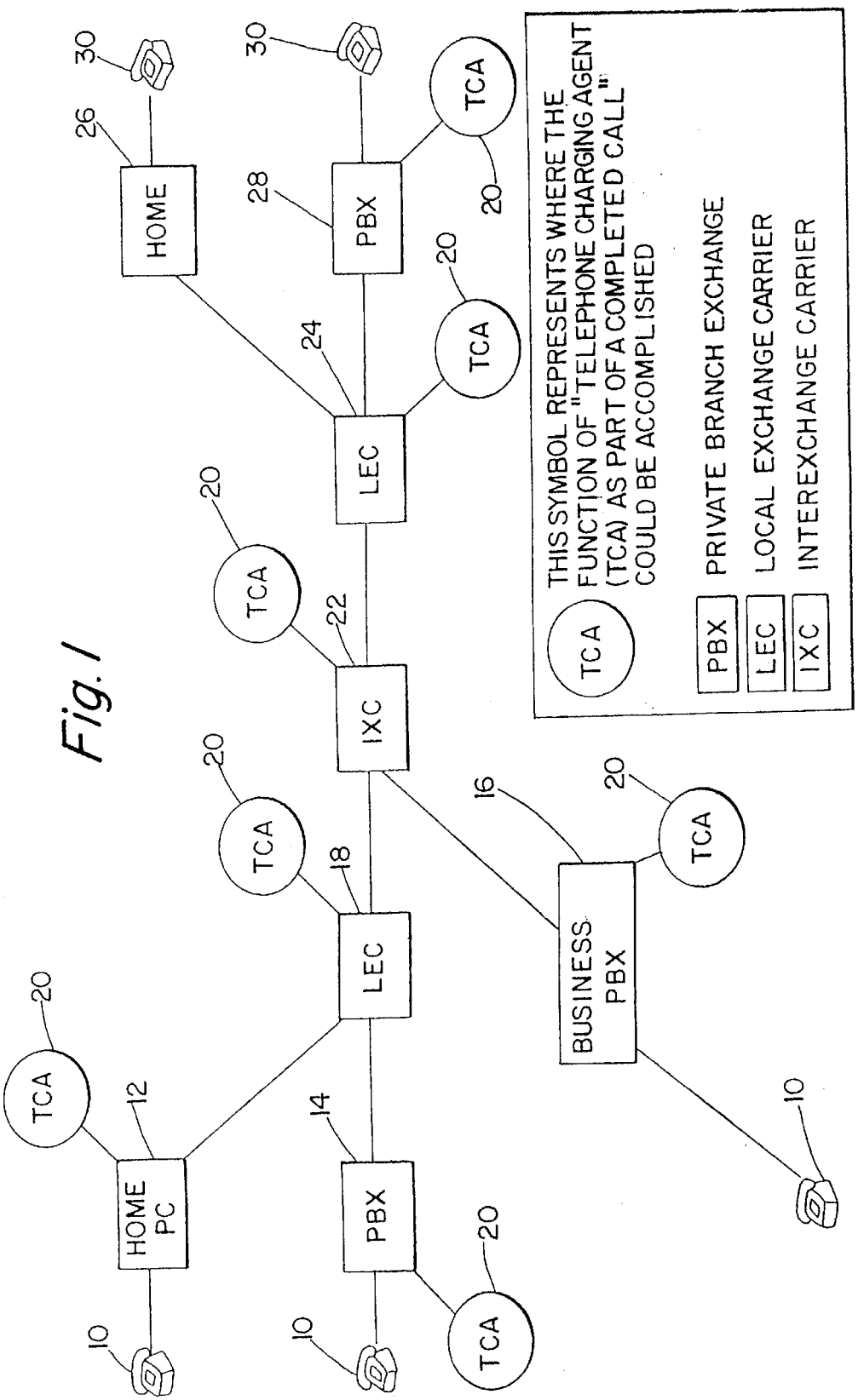
FIG. 1 is a diagrammatic view of the system organization for a preferred embodiment of the present invention.

Referring to FIG. 1, a diagrammatic view of the system organization for a preferred embodiment of the present invention is shown. A telephone call may be initiated at a telephone 10 connected to a home personal computer 12 or a private branch exchange (PBX) 14 that connects to a local exchange carrier (LEC) 18 and then to an interexchange carrier (IXC) 22. Alternatively, a telephone call may be initiated at a telephone 10 connected to a business PBX 16 that connects directly to an interexchange carrier (IXC) 22. The called party may be at a telephone 30 connected through home wiring 26 to a second LEC 24 or a second PBX 28 connected to the LEC 24. The TCA 20 that provides services to the calling and called party may be integrated into (i.e., operate at) the Home PC 12, the PBX 14, the Business PBX 16, the LEC that supports the calling party 20. As shown in FIG. 1, the TCA may be integrated into the telephone call transport system itself as an enhanced service, the telephone network of the local or long distance telephone company, a PC or separate processor supporting the call, or the PBX of the calling party or the called party. The location of the TCA may depend on the services that are needed by a particular (calling or called) party. The ability to integrate the TCA into the transport of the telephone call and/or into the telephone system used by a party, without requiring either the calling or called party to be specially equipped, is unique to the present invention.

Figure 2:
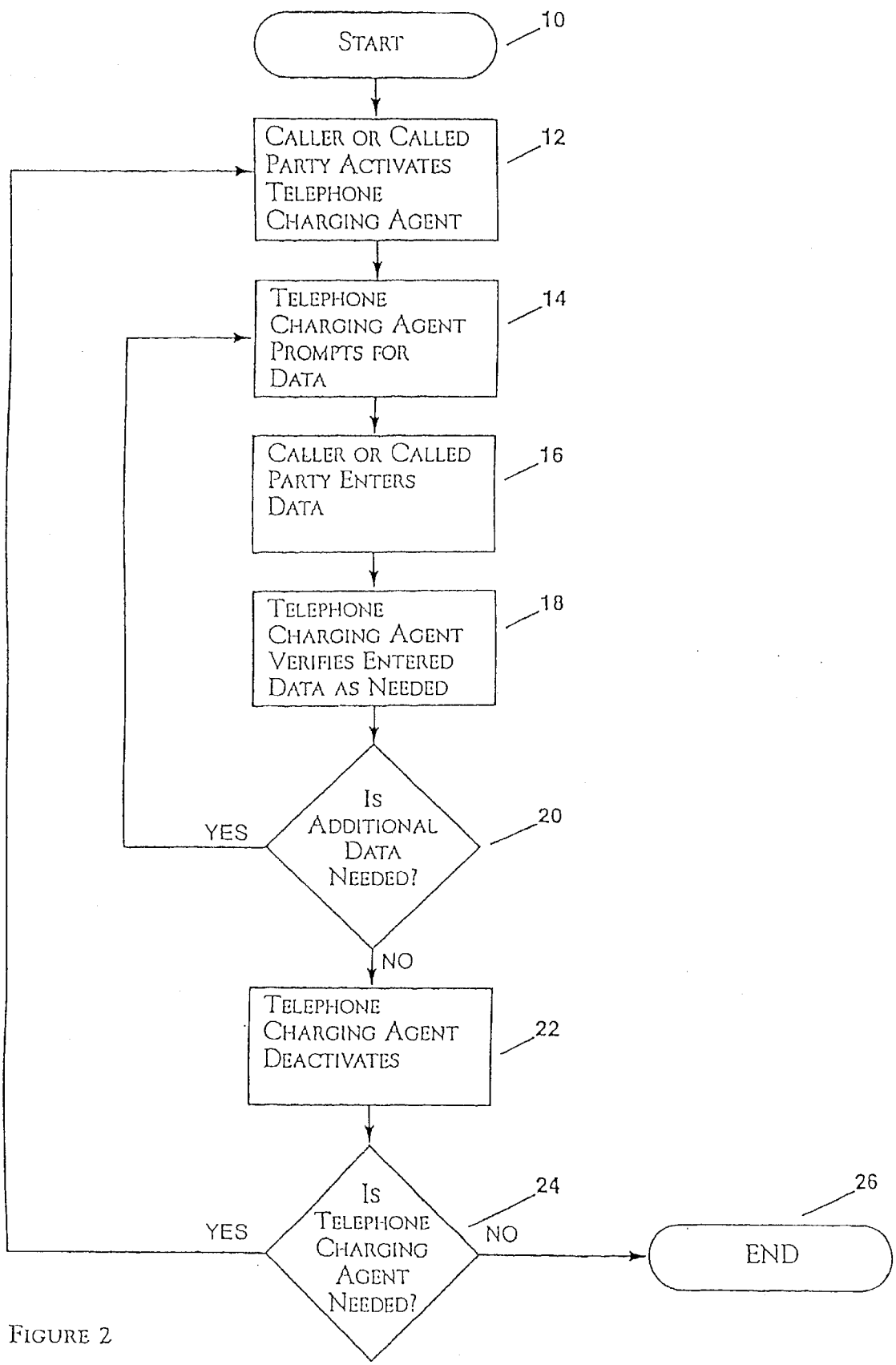
FIG. 2 is a flow chart of the principal steps involved in using the present invention.

Referring to FIG. 2, the principal steps in using the TCA are shown. First, the caller or called party activates the TCA 12. Preferably, the TCA may be activated using one of several methods. For example, the TCA may be activated by pressing a long touch tone such as the star key for longer than 400 milliseconds. Alternatively, the TCA may support voice recognition so that a key word spoken by a party during the call may invoke a TCA function. Stating a key word that the system is always listening for may invoke the system to start prompting for input. For example, if the system is configured to provide support for credit card transactions, the TCA may be activated by saying a phrase as "credit card assistance". If the system is named, the system name, such as "Zachariah", may be used.

In another embodiment, the TCA may be activated using data over voice means. If a party is using a modem that processes voice and data over a voice call, the data may be encapsulated and carried with the voice, but separated from the voice such that the voice conversation may continue while data is sent over the same telephone call. For example, if the caller was calling a party with a voice data modem, the called party could use the voice data connection to send data back to a TCA that is included on the call.

Once the TCA is activated, preferably, it prompts for data 14. For example, to support credit card transactions, the system may say "Credit card processing is now on-line. Please enter a 16 digit credit card number." Preferably, either the caller or called party may enter the credit card number. For example, if the caller is not calling from a touch-tone telephone, then the called party may enter the credit card number 16. The ability to allow either party to use a touch-tone telephone to enter data, in this case, the card number, is unique to the present invention. In an alternative embodiment, voice recognition may be used to enter the credit card number and all additional data.

In the next step, the TCA verifies the data entered as needed 18. For example, if the data entered was the credit card number, the TCA may verify that the number was of correct length and mathematical representation to ensure correct data entry. If additional data is necessary to complete the transaction 20, the TCA prompts for the needed data 14. For example, in processing a credit card transaction, the TCA may ask for the caller's home telephone number, social security number, serial number, or any other data. Additionally, the TCA may prompt for the collar amount of the transaction, including the cents that are involved. Next, the TCA may automatically calculate the necessary taxes based on the caller's location, home telephone number, origination ANI#, or the termination ANI#. Finally, the TCA may validate the credit card number, the caller's bank, the charged amount of other data as needed, and may provide an acknowledgment such as "the account that was entered has been successfully charged $50.00".

In the next step, the TCA may be deactivated because it is no longer needed 22. However, because it has the ability to continue listening for activation messages 24, it may be activated again during the same telephone call by any of the methods described earlier. The ability to summon the TCA at any point during the telephone call is unique to the present invention. Furthermore, either party has the ability to activate, control, and manipulate the TCA.

The integration of the TCA into the telephone call transport as an enhanced service or into a private branch exchange or other points in the transmission of the call results in several advantages over other methods. First, the information needed to complete a transaction may be modified during the completed telephone call. For example, a software user needing help with a software product may call an 800 number that is equipped with a credit card transaction agent that is integrated to the company receiving the 800 number calls. The call may be answered by a product support person who may use the TCA to place a $50.00 charge for solving the problem directly on the caller's credit card. If, after the product support person has answered the question, the caller feels the original charge is unfair, the credit card transaction may be summoned again through the TCA and a refund automatically issued. The product support persona and/or TCA may use prior knowledge of the transaction to issue a refund.

Another advantage of the present invention is that the TCA for facilitating the transaction may travel with the telephone call. Therefore, if the call is forwarded to another telephone, the TCA is still available because it is part of the forwarded transport and may be summoned at any time during the telephone call. The integration of the TCA into the transport or a private branch exchange or other points in the call transmission results in this advantage.

A preferred embodiment of the present invention has been described in detail. The description of this particular embodiment is merely illustrative of the principles underlying the inventive concept. It is therefore contemplated that various modifications of the disclosed embodiment will, without departing from the spirit and scope of the present invention, be apparent to persons of ordinary skill in the art.

What is claimed is:

1. A call transaction processing system comprising:

a call initiating device adapted to initiate a call;

a call receiving device adapted to receive a call from said call initiating device;

a completed call between a party at said call initiating device and a party at said call receiving device;

a transaction to be processed in association with said call; and, a transaction device integrated in the transport of said call to facilitate processing of said transaction, said transaction device adapted to be activated by a party through said call initiating device or through said call receiving device.

* * * * *